(12) United States Patent
Deshpande et al.

(10) Patent No.: US 10,977,132 B2
(45) Date of Patent: Apr. 13, 2021

(54) SELECTIVE PLACEMENT AND ADAPTIVE BACKUPS FOR POINT-IN-TIME DATABASE RECOVERY

(71) Applicant: INTERNATIONAL BUSINESS MACHINES CORPORATION, Armonk, NY (US)

(72) Inventors: Umesh Deshpande, San Jose, CA (US); Aayush Gupta, San Jose, CA (US); Chetan Sharma, Redmond, WA (US); Yuquan Shan, Fremont, CA (US); Paul H. Muench, San Jose, CA (US); Sangeetha Seshadri, Santa Clara, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 105 days.

(21) Appl. No.: 16/296,671

(22) Filed: Mar. 8, 2019

(65) Prior Publication Data
US 2020/0285542 A1 Sep. 10, 2020

(51) Int. Cl.
*G06F 11/14* (2006.01)
*G06F 11/10* (2006.01)

(52) U.S. Cl.
CPC ...... *G06F 11/1451* (2013.01); *G06F 11/1461* (2013.01); *G06F 11/1464* (2013.01); *G06F 11/1004* (2013.01); *G06F 2201/80* (2013.01)

(58) Field of Classification Search
CPC .................................................. G06F 11/1461
USPC .............. 707/999.202; 711/162; 714/15, 6.3
See application file for complete search history.

(56) References Cited

U.S. PATENT DOCUMENTS

| | | | |
|---|---|---|---|
| 2005/0086445 A1* | 4/2005 | Mizuno | G06F 11/1451 711/162 |
| 2014/0244590 A1 | 8/2014 | Chavda et al. | |
| 2015/0081639 A1 | 3/2015 | Jin et al. | |
| 2016/0350189 A1 | 8/2016 | Gupta et al. | |
| 2016/0335162 A1* | 11/2016 | Jin | G06F 11/1461 |

* cited by examiner

*Primary Examiner* — Baoquoc N To
(74) *Attorney, Agent, or Firm* — Griffiths & Seaton PLLC

(57) ABSTRACT

Embodiments for optimizing database backups to achieve a Recovery Time Object (RTO). A user-defined RTO configured for one or more databases is received. A backup frequency for initiating backups of the one or more databases is determined based on a continuously predicted recovery time associated with a plurality of factors. The backups of the one or more databases are executed at the determined backup frequency to ensure the user-defined RTO is achieved for the backups of the one or more databases. In some embodiments, a recovery window of the one or more databases may be increased using an RTO-aware tiered or remote storage caching operation for portions of the database, and an RTO-aware re-sharding operation on sharded databases may be performed when the backup frequency exceeds a predetermined threshold such that each shard may be restored within the user-defined RTO.

18 Claims, 10 Drawing Sheets

US 10,977,132 B2

SELECTIVE PLACEMENT AND ADAPTIVE BACKUPS FOR POINT-IN-TIME DATABASE RECOVERY

BACKGROUND OF THE INVENTION

Field of the Invention

The present invention relates generally to the field of computing systems, and more particularly, to database backup and recovery operations.

Description of the Related Art

A Database Management System (DBMS) stores large volumes of data to support diverse workloads and heterogeneous applications. The DBMS is critical to business transaction processing and decision making, and may incorporate strategies that promote keeping the data highly available. However, a DBMS may unexpectedly fail for various reasons, including defects in a hardware or software component within a computer system. To facilitate a quick and efficient recovery to these unexpected failures, various techniques exist to back up the underlying data and operational logs contained within the DBMS so as to restore the databases therein to a prior state. Particularly when integrated into distributed computing models and a cloud environment, these systems may become increasingly complex to maintain and restore, and therefore a continuing need exists to advance the underlying architecture supporting this data.

SUMMARY OF THE INVENTION

Various embodiments for optimizing database backups to achieve a Recovery Time Object (RTO), by a processor are provided. In one embodiment, by way of example only, a method comprises receiving a user-defined RTO configured for one or more databases; determining a backup frequency for initiating backups of the one or more databases, the backup frequency based on a continuously predicted recovery time associated with a plurality of factors; and executing the backups of the one or more databases at the determined backup frequency to ensure the user-defined RTO is achieved for the backups of the one or more databases. In some embodiments, a recovery window of the one or more databases may be increased using an RTO-aware tiered or remote storage caching operation for portions of the database, and an RTO-aware re-sharding operation on sharded databases may be performed when the backup frequency exceeds a predetermined threshold such that each shard may be restored within the user-defined RTO.

In addition to the foregoing exemplary embodiment, various other system and computer program product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
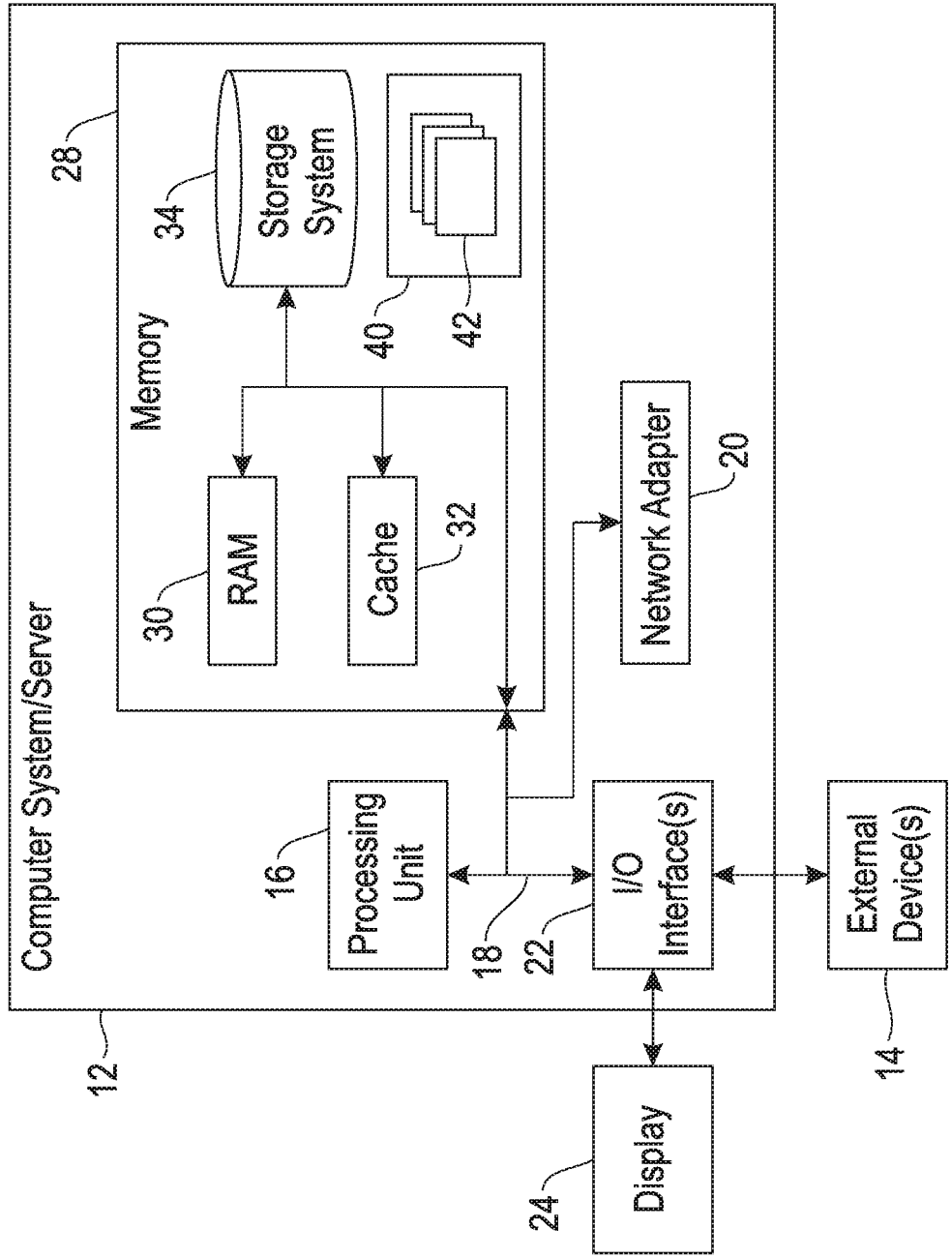
FIG. 1 is a block diagram depicting an exemplary cloud computing node according to embodiments of the present invention.

A DBMS may perform many complex operations, consisting of multiple steps, such as for example, creating a new table. The amount of work required to complete an operation varies, and may depend upon such factors as the algorithms and architecture chosen by the DBMS vendor to implement product features. In the event of failure, the DBMS may provide a capability to backup the state of the database to recover from a crash or to restore the database to its older state. The database's old state may need to be to restored, for instance, to track down an incorrect operation and remove its effect, to detect an intrusion and take corrective actions. However, to achieve this, the database should be able to recover precisely at the desired time or the database operation (i.e., the type of recovery known as point-in-time recovery). Thus, similar to the amount of work and time required to complete an operation, the time required to recover an operation (i.e., replay from the log) varies by the type of operation. For example, a table reorganization operation is much more complex, i.e., takes more steps to complete, than an operation to insert a row of data in a table, and consequently will take much longer to recover.

A recovery cost is not a simple linear function that is based solely on the amount of data and a number of operations, but is also dependent on the type of workloads and the complexity of the operations that are executed. The nonlinear nature of database operations makes it challenging for an administrator to predict the time it will take to perform a future recovery operation. Consequently, the administrator may often rely on a combination of intuition, trial and error, and experience when designing a recovery plan to meet the business enterprise's Recovery Time Objective (RTO), which may be referred to as a maximum length of time that a DBMS may remain unavailable following a service disruption, or the acceptable timeframe allowable to restore the old state of the database.

The point-in-time recovery mechanism is common among database systems. Some DBMS' use a combination of backup and operation logging to provide the point-in-time recovery functionality. These systems continuously log all the state modifying operations on the database. They also periodically backup the entire state of the database. When a user requests a recovery at a specific point in time, the backup just preceding the recovery point is retrieved and restored, then the operation log is replayed on the restored backup up to the recovery point. Since, log replay is a time consuming process, the periodic back-ups are helpful to reduce the recovery time. They allow the recovery process to jump directly close to the desired recovery point, thus avoiding the replay of the operation log from the beginning. Low recovery time can be achieved by backing up the database state more frequently. However, depending upon the database size frequent backups can be cost prohibitive, and may adversely impact the database performance. Hence, it is important that the interval between backups is set so as not to burden the resources while providing low recovery time. Moreover, the recovery time can be unpredictable based on the recovery point or the characteristics of the database, which makes conforming to the promised RTO challenging.

One solution that the administrator may often choose is to back up the DBMS more frequently than required, rather than risk a situation where the business may miss the RTO goal or be unable to meet a Service Level Agreement with an end user community. This problem becomes more pronounced in a cloud environment where the volume of data tends to be high, the types of workloads accessing the data tend to be much more diverse, and there tends to be fewer administrators available to manage the installation.

Accordingly, the mechanisms of the present invention implement such functionality as continuously predicting a recovery time during the normal operations of the database system to determine at what interval the database should be backed up. In this way, the RTO (i.e., as defined by a user/administrator) for recovering any particular point in time is ensured for a predefined time window (referred to herein as a "recovery window", e.g., available backups from the previous 10 days) A dedicated server called a "recovery server" may be deployed to perform the recovery as necessary, and the database backup interval(s) may be adjusted or adapted to be performed from the recovery server to avoid an RTO violation should the database need to be recovered. This model accounts for both the process to restore the database backups and the replay time required to replay the operational logs associated therewith. Additionally, embodiments of the present invention also provide RTO-aware placement techniques for storing the database backups fractionally within local and remote storage locations to extend the recovery window and quickly recover the database state without incurring a high space overhead of storing a large amount of files locally in faster (e.g., NVMe SSD), more expensive storage solutions. It should be noted that the functionality of the present invention may be employed within the context of a non-relational (NoSQL) database, where data is part of the write-ahead log and the log replay time may be predictable. Further, the mechanisms of the present invention may apply to both full database backups and/or incremental backups (i.e., where only modified files of the database are copied to the backup), as one skilled in the art would appreciate.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
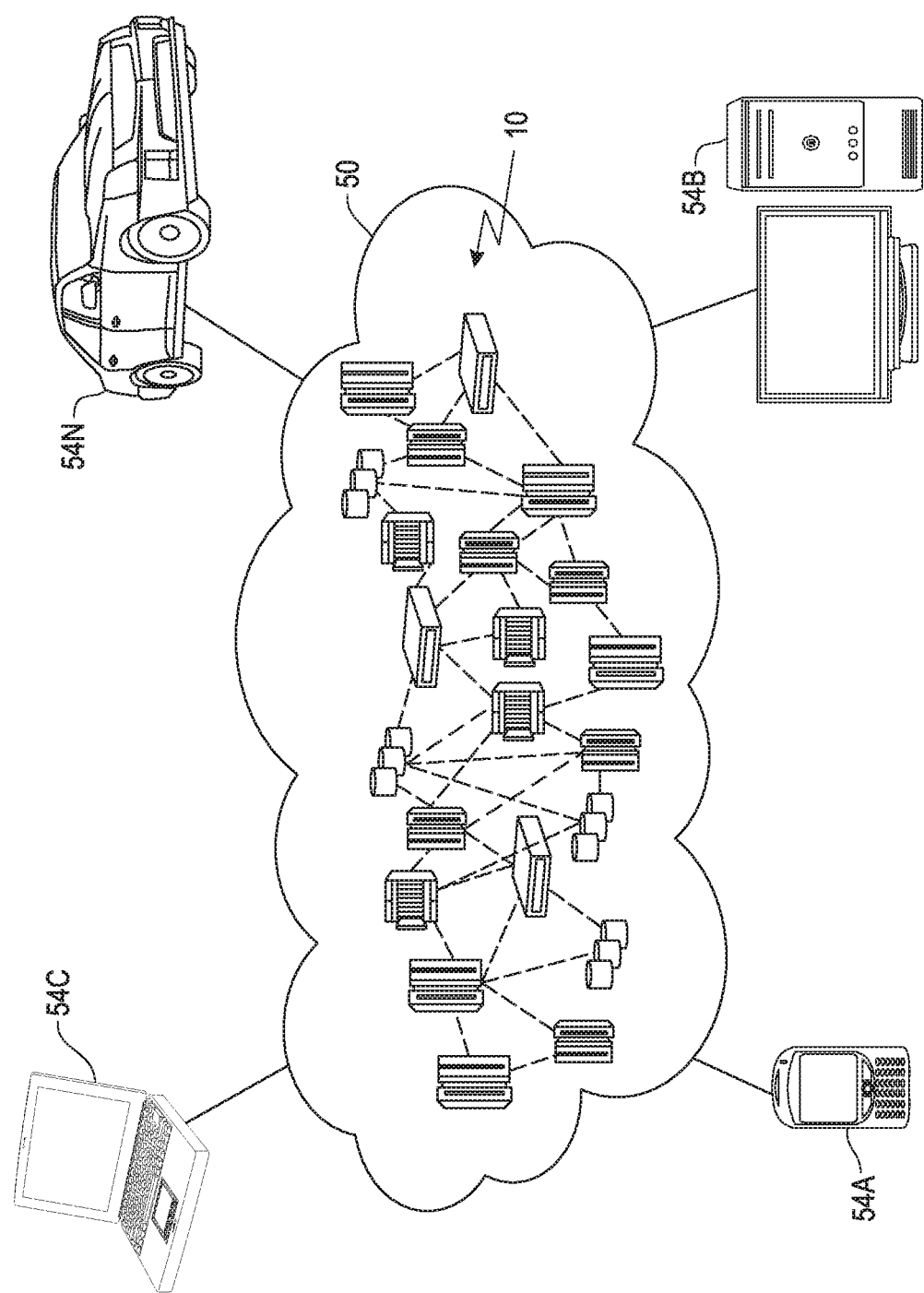
FIG. 2 is a block diagram depicting an exemplary cloud computing environment according to embodiments of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
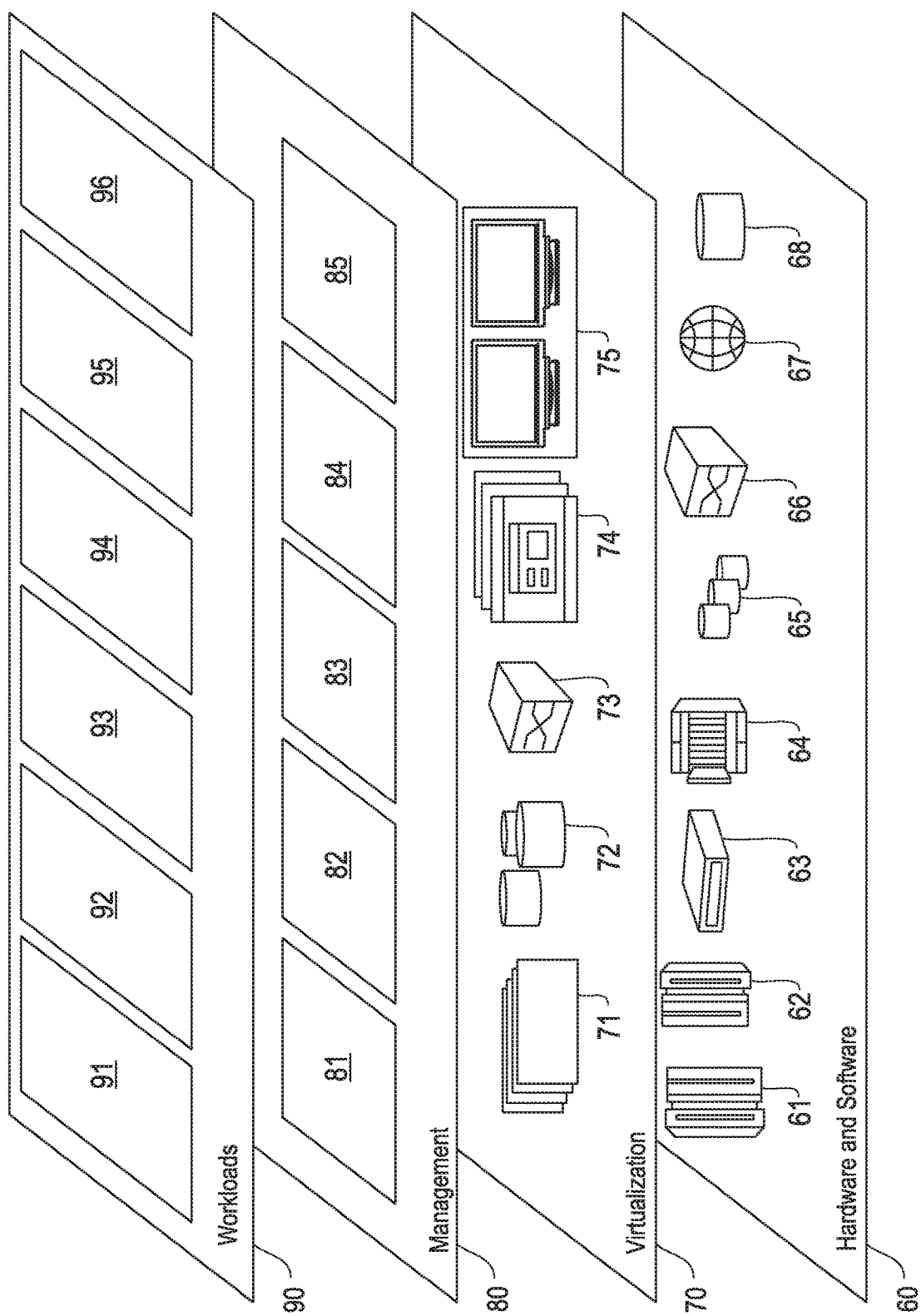
FIG. 3 is a block diagram depicting abstraction model layers according to embodiments of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various database recovery operations and functions 95. One of ordinary skill in the art will appreciate that the database recovery operations and functions 95 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
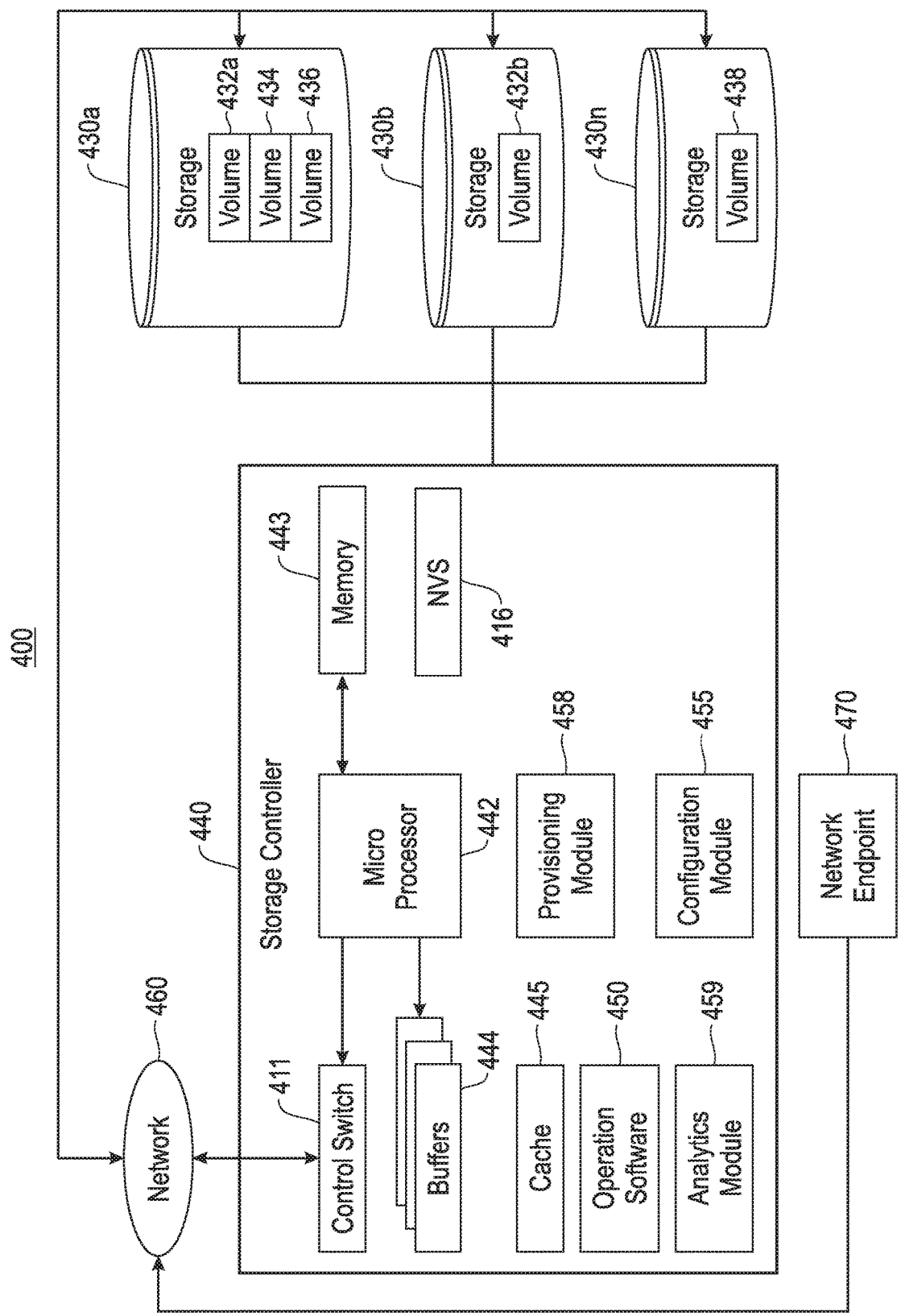
FIG. 4 is a block diagram depicting an exemplary hardware structure of a computing storage system in communication with the cloud computing environment, in which aspects of the present invention may be realized.

FIG. 4, following, is an additional block diagram showing a hardware structure of a data management system 400 that may be used in the overall context (i.e., as a portion of a distributed computing environment) of performing database recovery functionality according to various aspects of the present invention.

Network 460 may be a fibre channel (FC) fabric, a fibre channel point-to-point link, a fibre channel over Ethernet (FCoE) fabric or point to point link, a FICON or ESCON I/O interface, any other I/O interface type, a wireless network, a wired network, a LAN, a WAN, heterogeneous, homogeneous, public (i.e. the Internet), private, or any combination thereof. The ISP may provide local or distributed data among one or more locations and may be equipped with any type of fabric (or fabric channel) (not shown in FIG. 4) or network adapter 460 to the storage controller 440, such as Fibre channel, FICON, ESCON, Ethernet, fiber optic, wireless, or coaxial adapters. Network management system 400 is accordingly equipped with a suitable fabric (not shown in FIG. 4) or network adaptor 460 to communicate.

To facilitate a clearer understanding of the methods described herein, storage controller 440 is shown in FIG. 4 as a single processing unit, including a microprocessor 442, system memory 443 and nonvolatile storage ("NVS") 416. It is noted that in some embodiments, storage controller 440 is comprised of multiple processing units, each with their own processor complex and system memory, and interconnected by a dedicated network 460 within data storage system 400.

In a local or remote location, yet connected over network 460, storage 430 (labeled as 430a, 430b, and 430n herein) may be comprised of one or more storage devices, such as storage arrays, which are connected to storage controller 440 (e.g., by a storage network) as shown.

In some embodiments, the devices included in storage 430 may be connected in a loop architecture. Storage controller 440 manages storage 430 and facilitates the processing of write and read requests intended for storage 430. The system memory 443 of storage controller 440 stores program instructions and data, which the processor 442 may access for executing functions and method steps of the present invention for executing and managing storage 430 as described herein. In one embodiment, system memory 443 includes, is in association with, or is in communication with the operation software 450 for performing methods and operations described herein. As shown in FIG. 4, system memory 443 may also include or be in communication with a cache 445 for storage 430, also referred to herein as a "cache memory," for buffering "write data" and "read data," which respectively refer to write/read requests and their associated data. In one embodiment, cache 445 is allocated in a device external to system memory 443, yet remains accessible by microprocessor 442 and may serve to provide additional security against data loss, in addition to carrying out the operations as described herein.

In some embodiments, cache 445 is implemented with a volatile memory and non-volatile memory and coupled to microprocessor 442 via a local bus (not shown in FIG. 4) for enhanced performance of data storage system 400. The NVS 416 included in data storage controller 440 is accessible by microprocessor 442 and serves to provide additional support for operations and execution of the present invention as described in other figures. The NVS 416, may also be referred to as a "persistent" cache, or "cache memory" and is implemented with nonvolatile memory that may or may not utilize external power to retain data stored therein. The NVS 416 may be stored in and with the cache 445 for any purposes suited to accomplish the objectives of the present invention. In some embodiments, a backup power source (not shown in FIG. 4), such as a battery, supplies NVS 416 with sufficient power to retain the data stored therein in case of power loss to data storage system 400. In certain embodiments, the capacity of NVS 416 is less than or equal to the total capacity of cache 445.

Storage 430 may be physically comprised of one or more storage devices, such as storage arrays. A storage array is a logical grouping of individual storage devices, such as a hard disk. In certain embodiments, storage 430 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 4 may include a logical volume, or simply "volume," may have different kinds of allocations. Storage 430*a*, 430*b* and 430*n* are shown as ranks in data storage system 400, and are referred to herein as rank 430*a*, 430*b* and 430*n*. Ranks may be local to data storage system 200, or may be located at a physically remote location. In other words, a local storage controller may connect with a remote storage controller and manage storage at the remote location. Rank 430*a* is shown configured with two entire volumes, 434 and 436, as well as one partial volume 432*a*. Rank 430*b* is shown with another partial volume 432*b*. Thus volume 432 is allocated across ranks 430*a* and 430*b*. Rank 430*n* is shown as being fully allocated to volume 438—that is, rank 430*n* refers to the entire physical storage for volume 438. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

A network endpoint 470 is connected through the network 460 as shown. The network endpoint 470 is generically intended to refer to any number of network devices, such as a switch, a router, a wireless access point, or another device known generally to one of ordinary skill in the art. As will be further illustrated in the following figures, a user may use a networked device, (e.g., a device connected to network 460) to access the network 260. The networked device may include computers, tablets, smartphones, television set top boxes, televisions and other video equipment, or even a household appliance such as a refrigerator or a garage door opener, again as one of ordinary skill in the art will appreciate. Ultimately any device having communicative ability to and through network 460 is anticipated to use the network endpoint 470. In one embodiment, the depiction of a network endpoint 470 serves to provide a point where an input object (data object) is introduced into a distributed computing environment, as will be described.

The storage controller 440 may include a configuration module 455 and a provisioning module 458, among other functional components. The configuration module 455 and provisioning module 458 may operate in conjunction with each and every component of the storage controller 440, and storage devices 430. The configuration module 455 and provisioning module 458 may be structurally one complete module or may be associated and/or included with other individual modules. The configuration module 455 and provisioning module 458 may also be located at least partially in the cache 445 or other components, as one of ordinary skill in the art will appreciate.

The configuration module 455 and provisioning module 458 may individually and/or collectively perform various aspects of the present invention as will be further described. For example, the configuration module 455 may perform various system configuration operations in accordance with aspects of the illustrated embodiments, such as configuring the storage controller 440 to operate using a given set of definitional information, for example. The analytics module 459 may use data analytics to compute, identify, organize, create, delete, sequester, or perform other actions on various patterns, trends, and other characteristics identified in the data over the network 460 and between other distributed computing components in a distributed computing environment. As one of ordinary skill in the art will appreciate, the configuration module 455, provisioning module 458, and analytics module 459 may make up only a subset of various functional and/or functionally responsible entities in the data storage system 400.

Other ancillary hardware may be associated with the storage system 400. For example, as shown, the storage controller 440 includes a control switch 441, a microprocessor 442 for controlling all the storage controller 440, a nonvolatile control memory 443 for storing a microprogram (operation software) 250 for controlling the operation of storage controller 440, data for control, cache 445 for temporarily storing (buffering) data, and buffers 444 for assisting the cache 445 to read and write data, a control switch 441 for controlling a protocol to control data transfer to or from the storage devices 430, the configuration module 455, provisioning module 458, or other blocks of functionality, in which information may be set. Multiple buffers 444 may be implemented with the present invention to assist with the operations as described herein.

Figure 5:
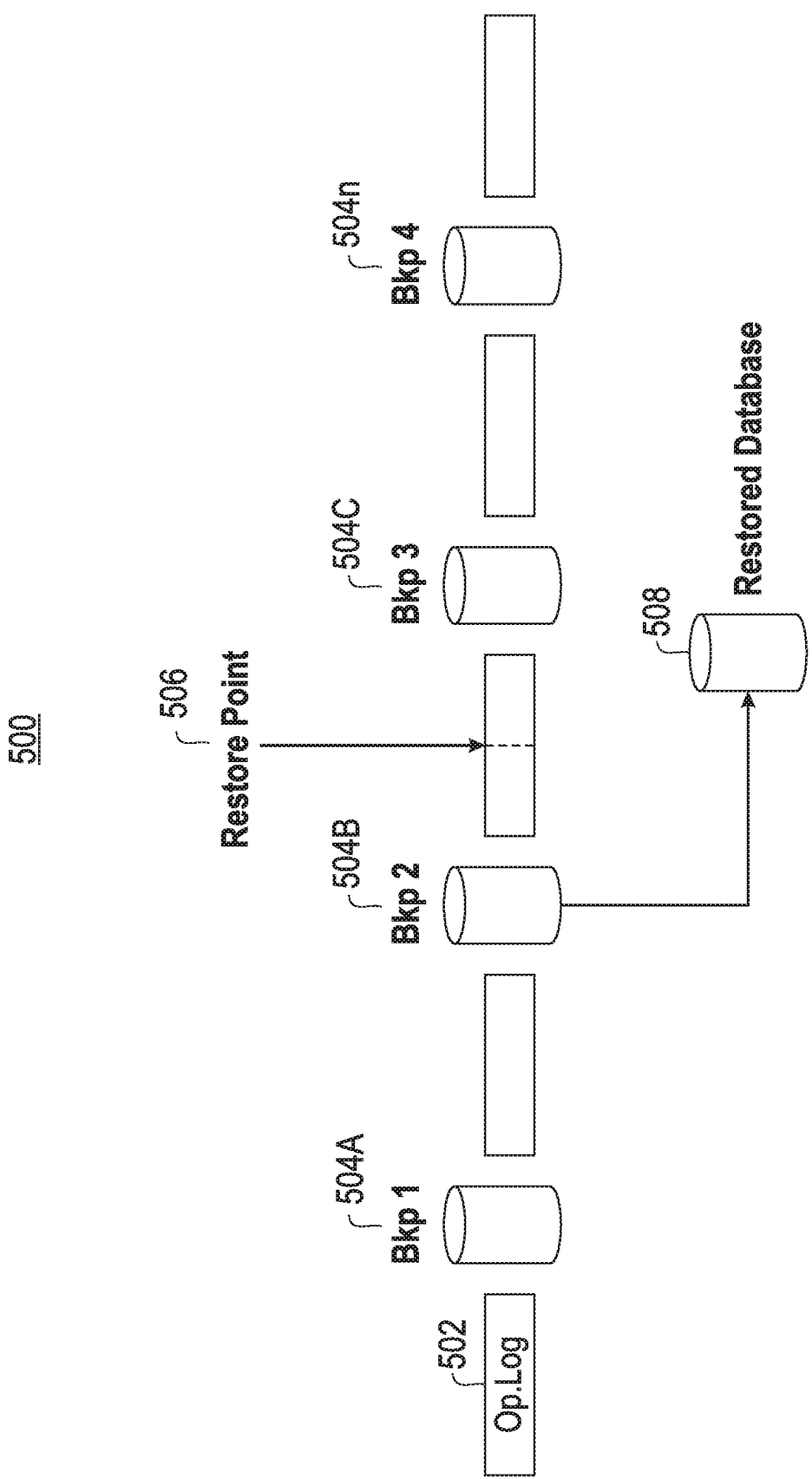
FIG. 5 is a block diagram depicting a recovery model of a point-in-time database recovery system, according to embodiments of the present invention.

Continuing to FIG. 5, a block diagram depicting a recovery model 500 of a point-in-time database recovery system is illustrated. Model 500 includes an operations log 502 along a (horizontal) time axis. At certain intervals, database backups 504A-504*n* are created using database data (e.g., files) commensurate with their operations log 502. When a user (e.g., an administrator), application, and/or other service requests that the database be restored to a particular point in time, the most recent backup is retrieved and the logged operations thereof are re-played over the backup to the specific restore point. In the instant example in model 500, to restore the database to the restore point 506, the backup-2 504B is loaded and the logged operations of the operations log 502 are replayed until the restore point 506 to create the restored database 508.

Figure 6:
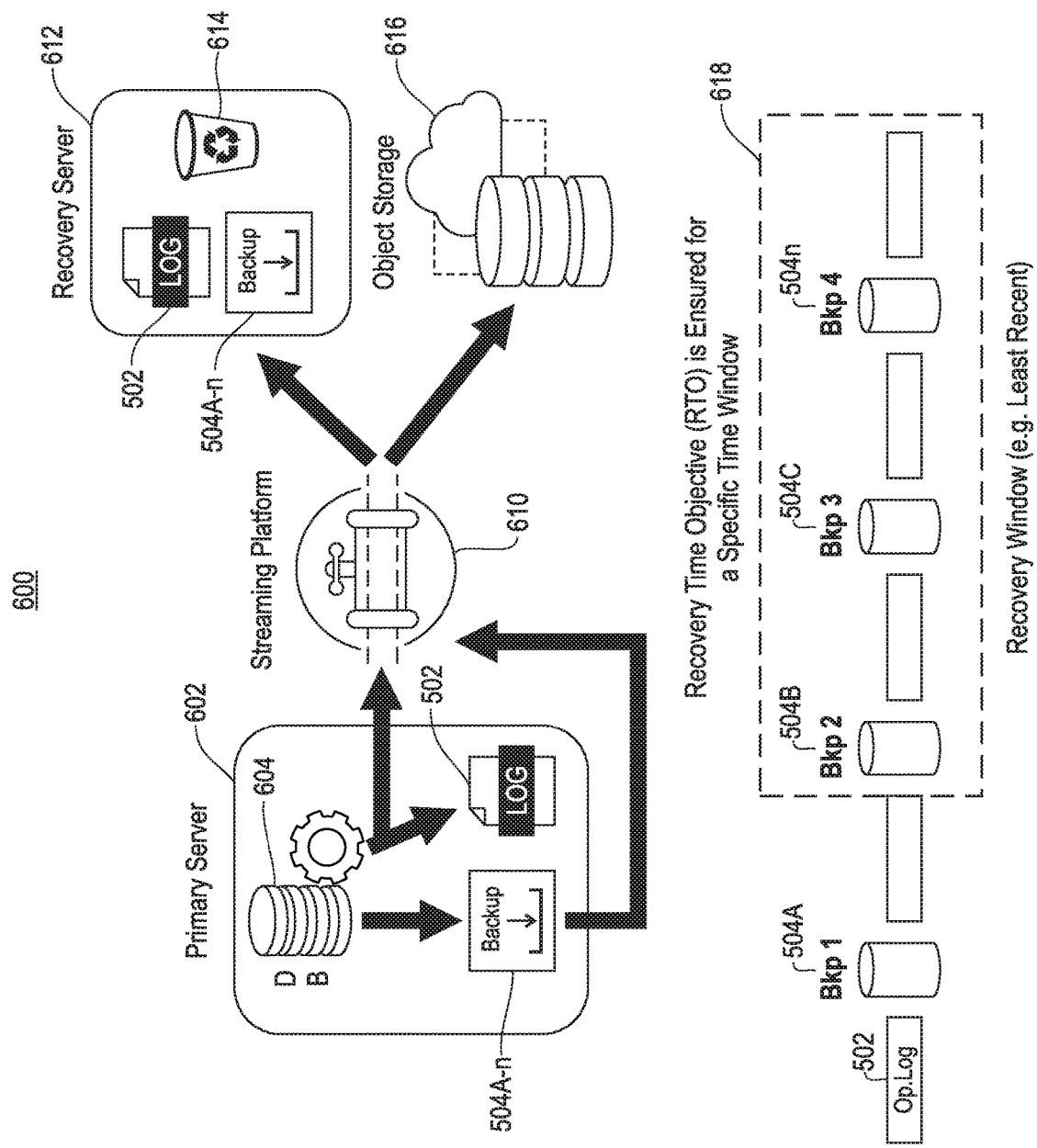
FIG. 6 is a block diagram depicting an architecture of a point-in-time database recovery system, according to embodiments of the present invention.

FIG. 6 illustrates an additional block diagram of an architecture 600 of the point-in-time database recovery system modeled in FIG. 5. The architecture 600 includes a primary server 602 storing a database 604. The database 604 is associated with the operations log 502 and one or more of the database backups 504A-n. The database backups 504A-n are sent through a streaming platform 610 (e.g., a central storage environment) to a recovery server 612 which stores log data of the operations log 502 and the one or more backups 504A-n (or portions thereof). The recovery server 612 and the streaming platform 610 may also communicate with an object storage 616. As previously mentioned, a recovery window 618 is also depicted as encompassing database backups 504B-n, which indicate these (least recent) backups are within a predefined time window able to be retrieved for recovery of the database 604.

In one implementation, the primary server 602 is the server that runs the database service and serves the database requests. The recovery server 612 is reserved solely for the purpose of recovering the database's past states. As the database processes the operations, any state modifying operations, such as, insert, update, delete, are also synchronously logged onto the storage in form of a journal, so that all operations can be recovered in case of a server failure. The journaling feature may additionally be leveraged to log each operation to another storage that is accessible from the recovery server, referred to as a recovery store. This could either be a local to the recovery server 612 or network attached on-premise storage. In addition to the database operations, the state of the database may also be incrementally backed up on the recovery store. Each backup restore point is marked with a timestamp, which is later used for recovery. The files included in the incremental backup only represent a part of the state required to restore the backup, and therefore, also maintained is a list of files required to restore the backup. All the files that are required to restore to any point within the recovery window 618 are kept on the backup store. While as the recovery window 618 slides forward with time, the unnecessary files are deleted from the store. Moreover, any backup restore points can also be backed up into the object storage 616 for long-term storage.

To recover to a specific time in the past, first is determined the backup restore point just preceding the desired recovery point. The list of files required to restore to that point is then referred to, to determine which files are necessary for the restore. The database 604 verifies the checksum of the backed up files to ensure correctness of the restore state, and subsequently, the log file (e.g., operations log 502) is retrieved succeeding the restore point and the operations are re-played on the database 604 until an operation is encountered having a desired timestamp.

In various implementations, the time to recover to any prior state of the database 604 consists of backup restore time and operation log replay time, which may be represented by the equation: Trecovery=Trestore+Treplay. Thus, to predict the frequency and intervals of future backups, the Trecovery time is used to continuously determine the most efficient backup schedule while maintaining the user-defined RTO. The restore time is the time required to restore the database 604 to a specific backup restore point (e.g., restore point 506). The database restore process consists of the following steps: 1) Loading all the required database files from the storage 616 used for storing backups (note that the set files required for restore are not simply the files that were copied during a specific incremental backup, but additionally includes all the required files); 2) Calculation of the checksum to ensure the integrity of the backup; and 3) Writing the database files to the recovery server 612. Since the previous steps are performed in parallel, the slowest step dictates the re-store time. In addition to the amount of data restored, the restore time of a database 604 also depends upon the characteristics of the recovery system, namely read bandwidth of the backup storage, write bandwidth of the recovery server's storage, CPU used for calculating the checksum, etc. The system may be profiled to consider these system characteristics, such that, for example, on the primary server 602, the restore time may be continuously predicted using the given recovery system profile. This restore time may be represented by the equation: Trestore=Max (BWread/SZ, α.SZ, BWwrite/SZ), where
BW=Storage bandwidth;
α=Checksum calculation factor; and
SZ=Amount of required data to be restored.

Similarly, the replay time is the time required to replay the operations log 502 in order. Since every operation is tagged with a timestamp, only the operations with the timestamp older than the desired recovery point are replayed. The operations log 502 replay consists of the following steps: 1) Loading of the log file from the storage; 2) Replaying of the operations on the database 604; and 3) Persisting the operations to the recovery server's storage. Since, again, each of these steps are performed in parallel, the slowest step dictates the replay time of the operations log 502. On the primary server 602, in addition to the backup restore time, the replay time since the last database backup 504A-n is maintained. Again similar to the restore time, the replay time of an operation depends upon the type of operation, number of operations, record size and the system parameters, such as CPU and storage bandwidth. The following equation shows the model used for predicting the recovery time, expressed as: Treplay=Max(Tload, Texecution, Tpersist).

In addition, the following equation calculates the time to load the operations log 502. This time depends upon the size of the operations log 502 and the read bandwidth of the storage: Tload=BWread/SZ.

In this step, the operation is executed and the changes are captured in the database's in-memory state and in the journal to provide crash consistency. The operations log 502 consists of different types of operations. Therefore, for each operation type, execution time is calculated separately and combined to calculate the total execution time. The execution time is a function of number of operations and the record size, expressed as: Texecution=ft (Nops, SZrec), t ∈ Operation Type.

The following equation calculates the time required to persist the data recorded in form of operations to the recovery server's storage: Tpersist=BWwrite/SZ, where
BW=Storage bandwidth;
SZ=Operation log size;
Nrec=Number of operations; and
SZrec=Record size.

It should be noted that the recovery server 612 may periodically (i.e., at certain defined intervals) replay portions of the write ahead logs to verify that the predicted time to replay the portion of the write ahead logs matches the actual time taken for replay. This data is then used as feedback to the primary server 602 to correct and adjust the model used for prediction.

To further predict the frequency and intervals of various backups, often the database workloads show known and predictable patterns. For instance, request surge is expected during a certain period of a day, while the activity slows down during the night. Such workload behaviors can be captured in form of profiles and can be used to schedule the backup so as to minimize its interference with workload. This workload profile may be analyzed to determine the best time to perform backup, with the goal to minimize its adverse impact on the workload, while not overstepping the bounds set by the proposed model to ensure the RTO. This may mean taking a backup ahead of time to avoid it being performed in the middle of an expected surge. Since the backup is a file copy operation, it is primarily a network-bound process. The decision to perform the backup ahead of time is a function of the amount of data to be transferred during the backup and the availability of network bandwidth, and thus, various thresholds may be defined associated with the network bandwidth to determine a best possible backup timeframe of the database 604.

Continuous backups and logging the database 604 operations generate large amount of data. To recovery to any point in time in the recovery window 618, all the required files and the operations logs need to be stored. Therefore, the recovery window 618 size is limited by the amount of available storage for storing the database backups 504A-n and operations log 502. For fast recovery, high bandwidth storage can be used, however this increases the storage cost. The cost can be reduced by using large amount of cheaper, slower storage, but it can also increase the recovery time. Therefore, in addition to using storage tiering techniques, the placement of files of the database backups 504A-n may be distributed amongst local and remote storage systems to maximize the recovery window 618 size, while keeping the storage cost low.

First, any files that are no longer required by all recovery points within a recovery window for a given database backup 504A-n are garbage collected (referred to as garbage collection 614) on the recovery server 612 to reduce the overall storage space needed for storage therein. Next, the database 604 files are distributed across local and remote storage applications such that only a fraction (e.g., a portion) of files for each restore point are present on either the local or remote storage servers. This fraction is determined so as not to violate the RTO guarantee. In other words, at least a portion of the files required for any particular point-in-time recovery restore point of the database backups 504A-n are cached within local storage, while a remaining portion of these files are stored on a remote storage server. The local storage may be storage which is local to the recovery server 612 and the remote storage may comprise any storage remotely located to the recovery server 612 (e.g., object storage 616). Local and remote recovery is modeled such that the checksum verifications and remote reads of the files from the remote storage is performed in parallel such that a full local restore is equivalent to a fractional restore.

In another embodiment, as an alternative or in addition to the local and remote storage of the file portions, the files may be distributed across faster and slower storage devices such as in a tiered storage environment. In tiered storage, the database files are distributed across different tiers so that only a fraction of files for each restore point are present on specific tier. The fraction is determined so as not to violate the RTO guarantee (i.e., the fraction of files on the slower storage can be retrieved in same time as the fraction stored on the faster storage). Thus, in tiered storage, the operation log segments are distributed across tiers so that the segments with higher load time to execution time ratio are kept on the slower storage devices (e.g., tape, disk drives, etc.) while the segments with lower load time to execution time ratio are kept on the faster storage devices (e.g., solid state drives (SSDs), etc.). This is performed because the segments with small average record size take longer to execute than to load. Therefore, since the loading and execution of operation log segments happens in parallel, for such segments the load time does not account towards the total replay time. Accordingly, for each segment stored in the slower storage devices, the segment must meet the criterion of Texecution<Tload.

For each recovery point (e.g., restore point 506), the fraction of files stored remotely on the remote storage may be expressed as, for Sz=f1.Sz+f2.Sz, each restore point maintains: f1.(Sz/B)<f2.(Sz/C) within the remote storage location, where
f1=Fraction of data stored remotely;
f2=Fraction of data stored locally;
B=Remote read bandwidth (MB/s);
C=Rate of checksum (MB/s); and
Sz=Size of total required data.

Figure 7:
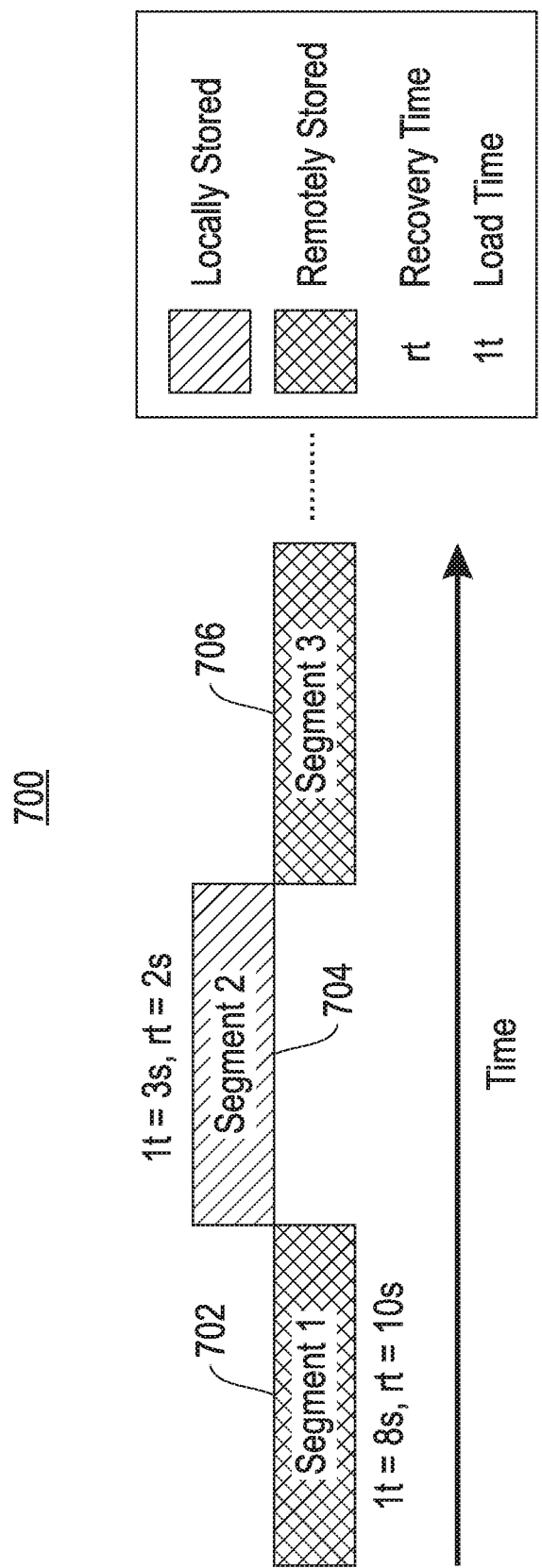
FIG. 7 is a block diagram depicting an additional recovery model of a point-in-time database recovery system, according to embodiments of the present invention.

In case of a database failure, all serialized operations may be stored in write ahead log (WAL). The WAL is used to recover the database 604 to its consistent state by replaying uncommitted records in the WAL. In some embodiments, WAL load and replay may be performed in parallel. The WAL recovery time is equal to the maximum of the load time and the replay time of the WAL, however, the time to load the WAL from slower storage (i.e., remote storage) can be masked if the replay time is slower than the load time. Thus, as depicted in the recovery model 700 of FIG. 7, WAL segments may be selectively placed on local or remote storage (and/or faster or slower storage devices) such that only the WAL segments having a load time higher than a replay time are stored locally on the recovery server 612. As depicted in model 700, segment-1 702 and segment-3 706 are stored remotely, as they have a higher replay time than load time—thus indicating that the slower replay time will mask the load time it takes to retrieve the segments from the remote storage. Segment-2 704, however, has a higher load time than replay time, and thus is stored locally so as to unencumber the playback of operations by mitigating the load time by retrieving the segment locally.

Figure 8A:
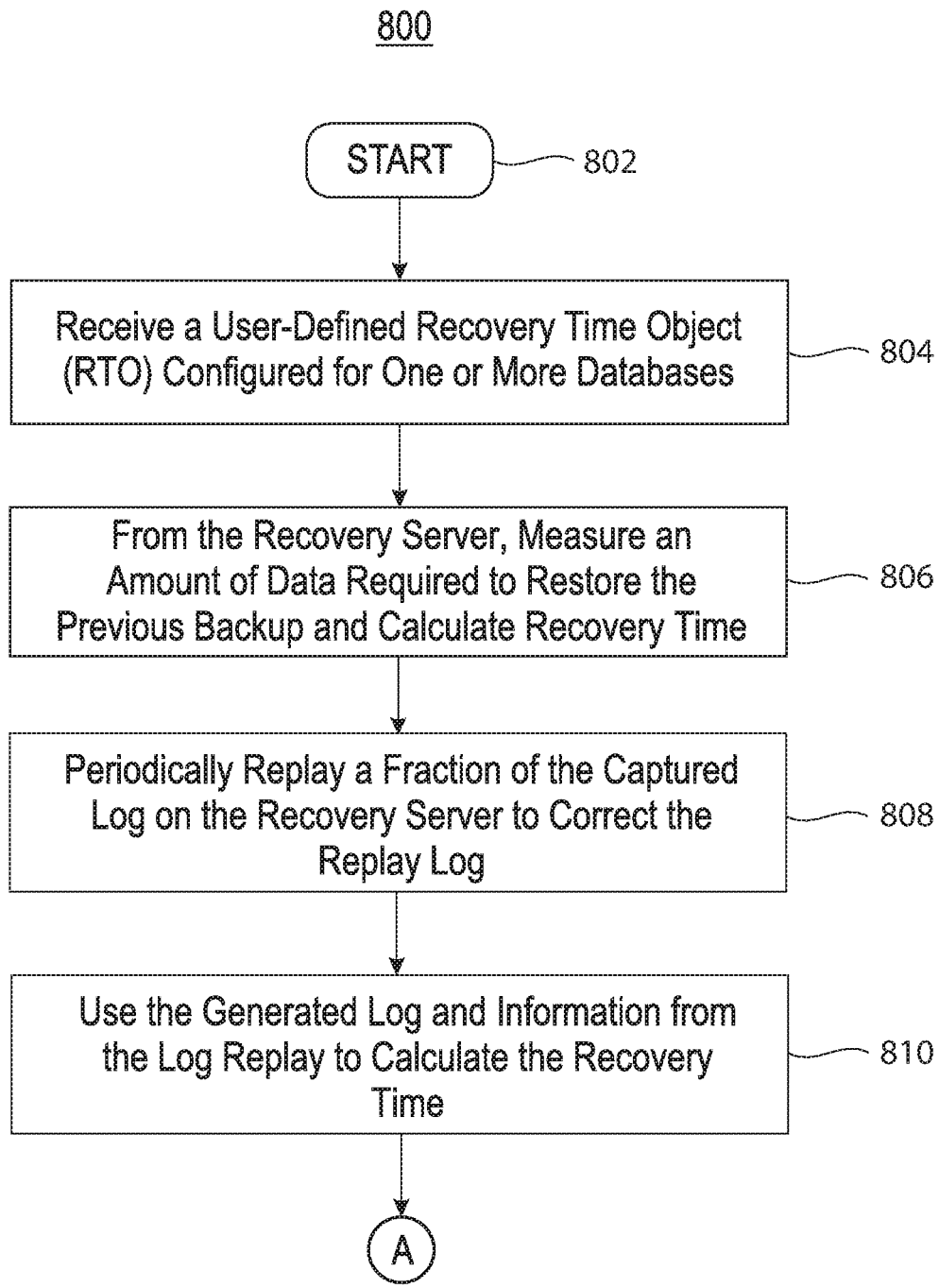
FIGS. 8A and 8B are flow chart diagrams illustrating an exemplary method for optimizing database backups to achieve a Recovery Time Object (RTO), by which aspects of the present invention may be implemented.
Figure 8B:
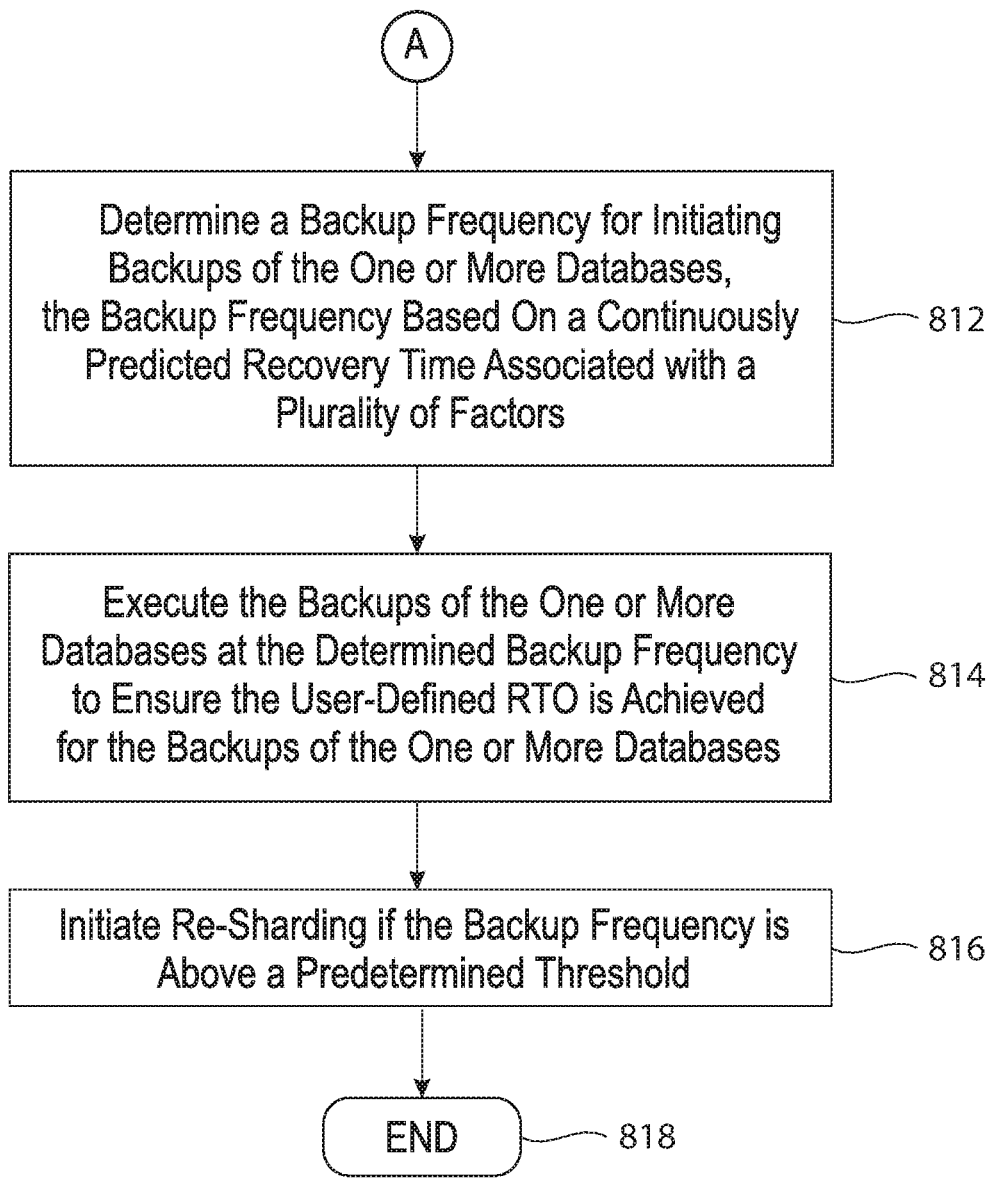
Figure 9:
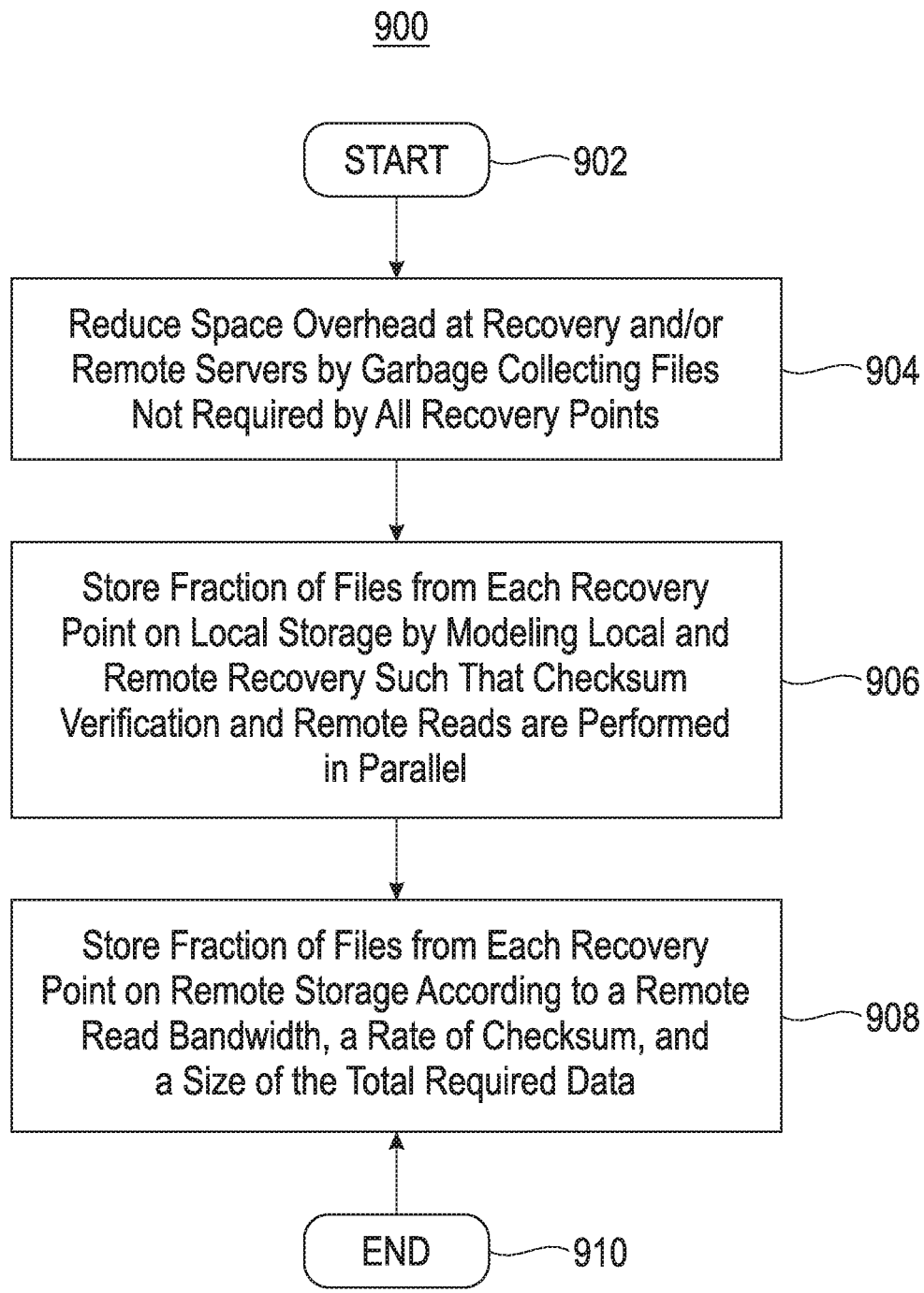
FIG. 9 is an additional flow chart diagram illustrating an exemplary method for optimizing database backups to achieve an RTO, by which aspects of the present invention may be implemented.

Reviewing the illustrated concepts, FIGS. 8A, 8B, and 9 illustrate methods 800 and 900, respectively, for optimizing database backups to achieve an RTO. The methods 800 and 900 may be performed in accordance with the present invention in any of the environments depicted in FIGS. 1-4, among others, in various embodiments. Of course, more or less operations than those specifically described in FIGS. 8A, 8B, and 9 may be included in methods 800 and 900, as would be understood by one of skill in the art upon reading the present descriptions.

Each of the steps of the methods 800 and 900 may be performed by any suitable component of the operating environment. For example, in various embodiments, the methods 800 and 900 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the methods 800 and 900. Illustrative processors include, but are not limited to, a central processing unit (CPU), an application specific integrated circuit (ASIC), a field programmable gate array (FPGA), etc., combinations thereof, or any other suitable computing device known in the art.

Referring now to FIGS. 8A and 8B, the method 800 begins (step 802) by receiving a user-defined RTO configured for one or more databases (step 804). An amount of data required to restore the previous backup is measured by the recovery server 612 (step 806). From this measurement value, the recovery time may be computed according to the formula prescribed supra. Periodically (i.e., according to defined intervals, randomly, etc.) a fraction of the captured operations log 502 is replayed on the recovery server 612 to determine whether the predicted replay time matches the actual replay time of the log (step 808). The log information generated from the replayed operations log 502 is then used to calculate the actual recovery time (step 810), such that the replay of the operations log 502 is used as feedback to the primary server 602 to adjust the known recovery time.

Continuing, a backup frequency for initiating backups of the one or more databases is determined based on the continuously predicted recovery time associated with a plurality of factors (including the feedback comparison of the actual recovery time vs. the predicted recovery time) (step 812). The backups of the one or more databases are then executed at the determined backup frequency to ensure the user-defined RTO is achieved for the backups of the one or more databases (step 814). According to this data (i.e., the determined backup frequency), a re-sharding operation (i.e., splitting a shard into multiple shards) is initiated if the backup frequency is above a predefined threshold (step 816). The method 800 ends (step 818).

As mentioned, a database shard is a partition of the data based on the key contents. For instance, in range-based partitioning, the records are divided into shards based on the distinct range to which they belong. Other commonly used sharding is a hash based sharding, where a hash function divides the keys into different buckets which act like shards. Sharding allows the database load to be spread across multiple machines (i.e., much like a distributed computing environment). More shards can be added to scale out the database as the load increases. Even though sharding balances the load across multiple machines, based on the sharding method used and the workload characteristics, certain shards can receive relatively higher load than the other shards, thus causing a skew.

When recovering a sharded system, the entire system may not be operational until all the shards have been recovered. Without any control of the recovery process, each shard recovers at its own pace, thus the slowest recovering shard dictating the recovery of the database. Therefore, considering the disparate nature of the shards, the present recovery system independently models the recovery time for each shard. Each shard independently follows its backup process, so allowing the shards to comply with the given RTO. The timestamps of the backups and operations in the operations log 502 therefore provide a consistent cut across the shards, so that during recovery, all shards represent respective states at the desired recovery point.

Referring now to FIG. 9, the method 900 begins (step 902) by reducing space overhead at recovery and/or remote servers by garbage collecting files not required by all recovery points within the given recovery window of a particular point-in-time database backup (step 904). A fraction of files from each recovery point are stored on local storage, and local and remote recovery of the database backups associated with the files are modeled such that checksum verification and remote reads from the remote storage are performed in parallel (step 906). The remaining portion of the files associated with each recovery point of the database backups are stored in a remote storage location according to a remote read bandwidth, a rate of checksum, and a size of the total required data to complete the database restore (step 908). The method 900 ends (step 910).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for optimizing database backups to achieve a Recovery Time Object (RTO), by a processor, comprising:
   determining a backup frequency for initiating backups of one or more databases, the backup frequency based on a continuously predicted recovery time associated with a plurality of factors;
   executing the backups of the one or more databases at the determined backup frequency to ensure the RTO is achieved for the backups of the one or more databases;
   garbage collecting certain data within the backups no longer required by all restore points within a given recovery window to create a point-in-time recovery of the one or more databases associated therewith; and
   initiating a re-sharding operation on the one or more databases upon determining the backup frequency surpasses a predetermined threshold.

2. The method of claim 1, wherein:
   the plurality of factors include at least a restore time to load a previous backup and a replay time of operational logs associated with the previous backup; and
   the backups of the one or more databases comprise incremental backups.

3. The method of claim 2, further including caching a certain portion of data corresponding to each of a plurality of the restore points within the backups locally on a recovery server to ensure a specific RTO recovery window is met; wherein a remaining portion of the data is stored remotely on a remote storage server; or
   caching a certain portion of data corresponding to each of a plurality of the restore points within the backups on a fast storage device to ensure a specific RTO recovery window is met;
   wherein a remaining portion of the data is stored on a slow storage device.

4. The method of claim 3, further including modeling recovery of both the certain portion of the data cached locally and the remaining portion of the data stored remotely to perform checksum verification in parallel and remote reads of the data during the point-in-time recovery.

5. The method of claim 4, wherein write ahead log (WAL) segments are selectively placed within the certain portion of the data cached locally or the remaining portion of the data stored remotely such that WAL load and replay of the operational logs is performed in parallel during the point-in-time recovery.

6. The method of claim 5, wherein only the WAL segments having the restore time higher than the replay time are cached locally on the recovery server.

7. A system for optimizing database backups to achieve a Recovery Time Object (RTO), comprising:
   a processor executing instructions stored in a memory device; wherein the processor:
      determines a backup frequency for initiating backups of one or more databases, the backup frequency based on a continuously predicted recovery time associated with a plurality of factors;
      executes the backups of the one or more databases at the determined backup frequency to ensure the RTO is achieved for the backups of the one or more databases;
      garbage collects certain data within the backups no longer required by all restore points within a given recovery window to create a point-in-time recovery of the one or more databases associated therewith; and
      initiates a re-sharding operation on the one or more databases upon determining the backup frequency surpasses a predetermined threshold.

8. The system of claim 7, wherein:
   the plurality of factors include at least a restore time to load a previous backup and a replay time of operational logs associated with the previous backup; and the backups of the one or more databases comprise incremental backups.

9. The system of claim 8, wherein the processor caches a certain portion of data corresponding to each of a plurality of the restore points within the backups locally on a recovery server to ensure a specific RTO recovery window is met; wherein a remaining portion of the data is stored remotely on a remote storage server; or wherein the processor caches a certain portion of data corresponding to each of a plurality of the restore points within the backups on a fast storage device to ensure a specific RTO recovery window is met; wherein a remaining portion of the data is stored on a slow storage device.

10. The system of claim 9, wherein the processor models recovery of both the certain portion of the data cached locally and the remaining portion of the data stored remotely to perform checksum verification in parallel and remote reads of the data during the point-in-time recovery.

11. The system of claim 10, wherein write ahead log (WAL) segments are selectively placed within the certain portion of the data cached locally or the remaining portion of the data stored remotely such that WAL load and replay of the operational logs is performed in parallel during the point-in-time recovery.

12. The system of claim 11, wherein only the WAL segments having the restore time higher than the replay time are cached locally on the recovery server.

13. A computer program product for optimizing database backups to achieve a Recovery Time Object (RTO), by a processor, the computer program product embodied on a non-transitory computer-readable storage medium having computer-readable program code portions stored therein, the computer-readable program code portions comprising:

an executable portion that determines a backup frequency for initiating backups of one or more databases, the backup frequency based on a continuously predicted recovery time associated with a plurality of factors;

an executable portion that executes the backups of the one or more databases at the determined backup frequency to ensure the RTO is achieved for the backups of the one or more databases;

an executable portion that garbage collects certain data within the backups no longer required by all restore points within a given recovery window to create a point-in-time recovery of the one or more databases associated therewith; and an executable portion that initiates a re-sharding operation on the one or more databases upon determining the backup frequency surpasses a predetermined threshold.

14. The computer program product of claim 13, wherein:

the plurality of factors include at least a restore time to load a previous backup and a replay time of operational logs associated with the previous backup; and the backups of the one or more databases comprise incremental backups.

15. The computer program product of claim 14, further including an executable portion that caches a certain portion of data corresponding to each of a plurality of the restore points within the backups locally on a recovery server to ensure a specific RTO recovery window is met; wherein a remaining portion of the data is stored remotely on a remote storage server; or an executable portion that caches a certain portion of data corresponding to each of a plurality of the restore points within the backups on a fast storage device to ensure a specific RTO recovery window is met; wherein a remaining portion of the data is stored on a slow storage device.

16. The computer program product of claim 15, further including an executable portion that models recovery of both the certain portion of the data cached locally and the remaining portion of the data stored remotely to perform checksum verification in parallel and remote reads of the data during the point-in-time recovery.

17. The computer program product of claim 16, wherein write ahead log (WAL) segments are selectively placed within the certain portion of the data cached locally or the remaining portion of the data stored remotely such that WAL load and replay of the operational logs is performed in parallel during the point-in-time recovery.

18. The computer program product of claim 17, wherein only the WAL segments having the restore time higher than the replay time are cached locally on the recovery server.

\* \* \* \* \*